United States Patent
Kawasaki et al.

(10) Patent No.: US 9,727,442 B2
(45) Date of Patent: Aug. 8, 2017

(54) ENGINEERING TOOL, PROGRAM EDITING DEVICE, AND PROGRAM EDITING SYSTEM

(71) Applicant: Mitsubishi Electric Corporation, Tokyo (JP)

(72) Inventors: Shinsuke Kawasaki, Tokyo (JP); Takayuki Yamaoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/904,184

(22) PCT Filed: May 8, 2014

(86) PCT No.: PCT/JP2014/062342
§ 371 (c)(1),
(2) Date: Jan. 11, 2016

(87) PCT Pub. No.: WO2015/170382
PCT Pub. Date: Nov. 12, 2015

(65) Prior Publication Data
US 2016/0147638 A1 May 26, 2016

(51) Int. Cl.
*G06F 11/36* (2006.01)
*G06F 9/44* (2006.01)
(Continued)

(52) U.S. Cl.
CPC ...... *G06F 11/3636* (2013.01); *G05B 19/0426* (2013.01); *G05B 19/056* (2013.01);
(Continued)

(58) Field of Classification Search
CPC ............ G06F 11/3648; G06F 11/3656; G06F 11/362; G06F 11/2236; G06F 11/3636;
(Continued)

(56) References Cited

U.S. PATENT DOCUMENTS 8,745,591 B2 * 6/2014 De Smet ............ G06F 11/3636
717/125
9,417,626 B2 * 8/2016 Jones ................ G05B 19/0426
(Continued)

FOREIGN PATENT DOCUMENTS

DE 11 2012 006 107 T5 12/2014
EP 2 567 295 B1 10/2015
(Continued)

OTHER PUBLICATIONS

Bainbridge et al., Greenbug: a hybrid web-inspector, debugger and design editor for greenstone, Jul. 2013, 2 pages.*
(Continued)

*Primary Examiner* — Thuy Dao
(74) *Attorney, Agent, or Firm* — Sughrue Mion, PLLC; Richard C. Turner

(57) ABSTRACT

An engineering tool includes a program display/editing unit that edits an official program to be run as an actual product and a debugging program to be used at the time of operation confirmation of the official program distinctively in such a manner that the debugging program is executed by a controller when the debugging program is selected and that the official program is executed by the controller without the debugging program being executed when the debugging program is not selected.

8 Claims, 7 Drawing Sheets

(51) Int. Cl.
*G06F 11/34* (2006.01)
*G06F 3/0484* (2013.01)
*G05B 19/042* (2006.01)
*G05B 19/05* (2006.01)

(52) U.S. Cl.
CPC ........ *G06F 3/0484* (2013.01); *G06F 11/3664* (2013.01); *G05B 2219/13142* (2013.01); *G05B 2219/23283* (2013.01)

(58) Field of Classification Search
CPC ............... G06F 11/3664; G06F 3/0484; G05B 19/0426; G05B 19/056; G05B 19/058; G05B 2219/2351; G05B 2219/23293
See application file for complete search history.

(56) References Cited

U.S. PATENT DOCUMENTS

| | | | |
|---|---|---|---|
| 2003/0036813 | A1 | 2/2003 | Gasiorek et al. |
| 2012/0072777 | A1 | 3/2012 | Nonomura |
| 2013/0007720 | A1* | 1/2013 | Cai ..................... G06F 11/3664 717/130 |
| 2014/0059518 | A1* | 2/2014 | Sierk ......................... G06F 8/34 717/107 |
| 2014/0236997 | A1* | 8/2014 | Okamura ............ G06F 11/3664 707/781 |
| 2015/0301923 | A1 | 10/2015 | Yamaoka |
| 2016/0147637 | A1* | 5/2016 | Bhagavan ........... G06F 11/3664 717/127 |
| 2016/0188440 | A1* | 6/2016 | Bates ................. G06F 11/3624 717/129 |

FOREIGN PATENT DOCUMENTS

| | | |
|---|---|---|
| JP | 03-240803 A | 10/1991 |
| JP | 04-370805 A | 12/1992 |
| JP | 11-242509 A | 9/1999 |
| JP | 11-249715 A | 9/1999 |
| JP | 2004-062223 A | 2/2004 |
| JP | 2005-038260 A | 2/2005 |
| JP | 2008-059421 A | 3/2008 |
| JP | 2009-193276 A | 8/2009 |
| JP | 2010-224597 A | 10/2010 |
| JP | 2011-022838 A | 2/2011 |
| JP | 2012-027639 A | 2/2012 |
| JP | 2013-025347 A | 2/2013 |
| JP | 2013-084112 A | 5/2013 |
| TW | 201339773 A | 10/2013 |
| WO | 2010/137139 A1 | 12/2010 |
| WO | 2013/145015 A1 | 10/2013 |

OTHER PUBLICATIONS

Hejmady et al., Visual attention patterns during program debugging with an IDE, Mar. 2012, 4 pages.*
Communication dated Feb. 22, 2016, from the Intellectual Property Office of Taiwan in counterpart application No. 104114115.
Japanese Office Action issued in JP 2015-521902 dated Jun. 25, 2015.
Japanese Decision to Grant issued in JP 2015-521902 dated Nov. 11, 2015.
International Search Report of PCT/JP2014/062342 dated Aug. 5, 2014.
Communication dated Sep. 26, 2016 from the German Patent and Trademark Office in counterpart Application No. 11 2014 002 979.3.

* cited by examiner

ENGINEERING TOOL, PROGRAM EDITING DEVICE, AND PROGRAM EDITING SYSTEM

CROSS REFERENCE TO RELATED APPLICATIONS

This is a National Stage of International Application No. PCT/JP2014/062342 filed May 8, 2014, the contents of which are incorporated herein by reference in its entirety.

FIELD

The present invention relates to an engineering tool, a program editing device, and a program editing system that create a sequence program.

BACKGROUND

As methods for debugging a sequence program, there are a method of performing a current-value changing process and a method of conducting a test with an execution condition. In these methods, however, a setting operation requires some work. The current-value changing process is a process of manually changing a memory value during execution of a sequence program. To perform the current-value changing process, a dedicated dialog screen needs to be opened to specify the number of a memory and the value thereof to be changed. The test with an execution condition has a function of setting the value of a memory to a specified value at a specific position (a condition) in a sequence program. In this function, the condition, the number of the memory, and the value thereof to be changed need to be specified after opening a dedicated dialog screen other than a program editor.

As another method for debugging a sequence program, there is a method of performing a series of operations, for example, as indicated by the following (1) to (6) (see Patent Literature 1, for example). In the following descriptions, a sequence program that runs as an actual product is referred to as "official program".

(1) An official program is created and converted to be executable by a controller.
(2) The official program is written to the controller and executed by the controller, and the operation thereof is confirmed on a monitor or the like.
(3) When a bug is detected during execution, a debugging program is added to a bugged position that is to be debugged in the official program. The debugging program is added, for example, by inserting a circuit element of "OR TRUE" to a condition portion of a circuit that is to be always ON. The entire program having the debugging program inserted thereto is then converted to be executable by the controller.
(4) The entire program including the debugging program is written to the controller and executed by the controller, and the operation thereof is confirmed again on the monitor or the like.
(5) In a case where the operation is confirmed by switching execution between the official program and the debugging program, the above (3) and (4) are repeated. Specifically, correction, conversion, write, and operation confirmation of the entire program are repeated.
(6) After a normal operation of the official program is confirmed, the debugging program portion is deleted. The official program is converted again to be executable by the controller and is written to the controller. The controller then performs processing using the official program.

CITATION LIST

Patent Literature

Patent Literature 1: Japanese Patent Application Laid-open No. H4-370805

SUMMARY

Technical Problem

However, in the conventional technique described above, edit, conversion, write, and execution of a program need to be repeated during a debug operation and thus there is a problem that the debug operation requires some work.

The present invention has been achieved in view of the above problem and an object of the present invention is to provide an engineering tool, a program editing device, and a program editing system that can easily debug a program.

Solution to Problem

According an aspect of the present invention in order to solve the above problems and achieve the object, there is provided an engineering tool comprising a program display/editing unit that edits an official program to be run as an actual product and a debugging program to be used at a time of operation confirmation of the official program distinctively in such a manner that the debugging program is executed by a controller when the debugging program is selected and that the official program is executed by the controller without the debugging program being executed when the debugging program is not selected.

Advantageous Effects of Invention

According to the present invention, it is possible to create a sequence program that can be debugged easily.

DESCRIPTION OF EMBODIMENTS

Exemplary embodiments of an engineering tool, a program editing device, and a program editing system according to the present invention will be explained below in detail with reference to the accompanying drawings. The present invention is not limited to the embodiments.

Embodiment

In an embodiment of the present invention, terms "official program", "debugging program", and "entire program" are used distinctively as follows.

Official program: a program code that is run as an actual product, or an execution project thereof. The official program is used when a controller controls a robot or the like at a manufacturing step and the like of an actual product.

Debugging program: a program code portion that is created and run for operation confirmation before product shipping, or an execution object thereof. The debugging program is a portion that does not run as an actual product.

Entire program: an official program having a debugging program inserted therein. The entire program is the entirety of a sequence program.

The entire program in the following descriptions can be an official program having a debugging program inserted therein or an official program before a debugging program is inserted therein.

Figure 1:
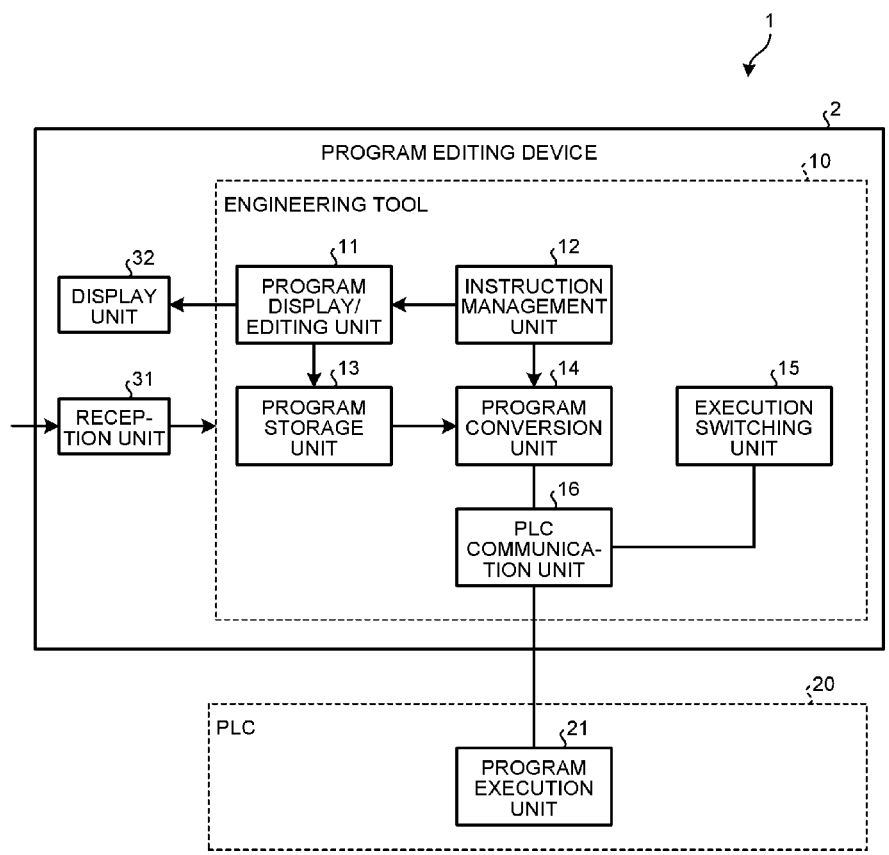
FIG. 1 is a diagram illustrating a configuration of a debug system according to an embodiment.

FIG. 1 is a diagram illustrating a configuration of a debug system according to the present embodiment. A debug system 1 using a PLC (Programmable Logic Controller) system has a program editing device 2 and a PLC 20. The program editing device 2 is a computer or the like and includes an engineering tool 10, a display unit 32 such as a monitor, and a reception unit 31 such as a mouse or a keyboard.

The reception unit 31 receives an official program created by an external device or the like, a direction from a user, and the like. The reception unit 31 is connected to the engineering tool 10 and inputs an official program or a direction input from a user to the engineering tool 10. The display unit 32 is connected to the engineering tool 10 and displays a sequence program such as an entire program, an official program, and a debugging program according to a direction from the engineering tool 10.

The engineering tool 10 is a programming tool that creates a sequence program such as a ladder program. The engineering tool 10 edits a sequence program that is run on the PLC 20. The engineering tool 10 can be realized, for example, as S/W (software) on a computer.

When debugging a sequence program, the debug system 1 reduces the design man-hour of the sequence program by eliminating work of creating a program dedicated for debugging and executing the program. In the present embodiment, the engineering tool 10 creates the entire program to enable switching between the official program and the debugging program.

The engineering tool 10 creates the entire program in such a manner that the debugging program includes a debug-specific instruction. The engineering tool 10 has a function of performing display and editing of the entire program distinctively between a portion corresponding to the debug-specific instruction and a portion corresponding to the official program. The PLC 20 executes the debug-specific instruction of the debugging program only during a debug mode and executes the official program during a normal mode.

The PLC 20 is an example of a controller and controls a robot or the like using a sequence program. The PLC 20 in the present embodiment controls a robot or the like using the entire program created by the engineering tool 10. The entire program is thus created, edited, or mode-switched by the engineering tool 10 and processing in accordance with a switched mode is performed by the PLC 20.

The engineering tool 10 includes a program display/editing unit 11, an instruction management unit 12, a program storage unit 13, a program conversion unit 14, an execution switching unit 15, and a PLC communication unit 16.

The program display/editing unit 11 is application software serving as an editor that edits a program code to be executed by the PLC 20. Ladder language is often used as a sequence program in the PLC 20 or a PLC system using a robot. A case where a sequence program is a ladder program is described below.

The program display/editing unit 11 performs display processing, edit processing, and the like of a sequence program to the display unit 32 based on a direction from a user input through the reception unit 31. For example, the program display/editing unit 11 inserts a debug-specific instruction corresponding to a direction from a user into a sequence program.

The program display/editing unit 11 edits an official program and a debugging program distinctively in such a manner that the debugging program is executed by the PLC 20 when the debugging program is selected and that the official program is executed by the PLC 20 without the debugging program being executed when the debugging program is not selected.

The program display/editing unit 11 switches a circuit in the official program specified by a user from the official program to the debugging program. The program display/editing unit 11 has a function of causing the debugging program created based on the debug-specific instruction to be displayed distinctively from the official program.

Figure 2:
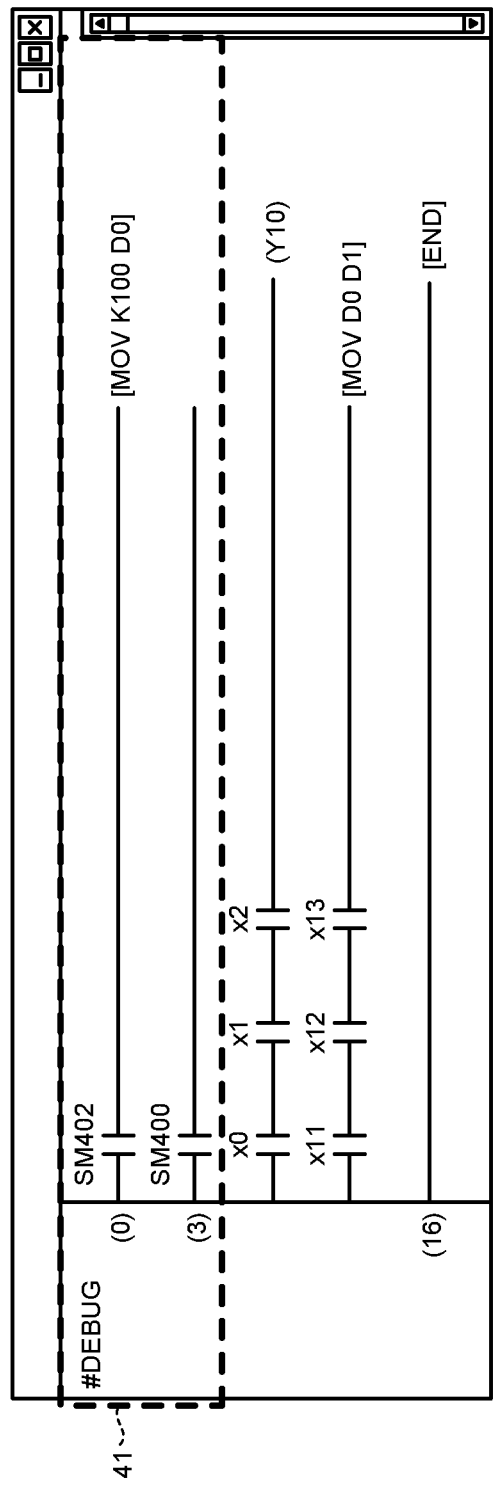
FIG. 2 is a diagram illustrating a display example of an entire program.

FIG. 2 is a diagram illustrating a display example of an entire program. The program display/editing unit 11 causes the display unit 32 to display at least a part of the entire program. At that time, the program display/editing unit 11 causes a debugging program 41 and an official program to be displayed distinctively. For example, the program display/editing unit 11 can cause the debugging program 41 and the official program to be displayed in different colors or can enclose the debugging program 41 with a predetermined line. The program display/editing unit 11 transmits the edited entire program to the program storage unit 13.

The instruction management unit 12 has stored therein a list of instructions that can be input to a sequence program by the program display/editing unit 11. The instruction management unit 12 manages official instructions to be used for the official program and debug-specific instructions to be used for the debugging program distinctively. The instructions managed by the instruction management unit 12 are transmitted to the program display/editing unit 11 based on directions from a user, respectively. The instructions managed by the instruction management unit 12 are read by the program conversion unit 14.

The program storage unit 13 has stored therein a program code of the official program before editing created by an external device and a program code of the entire program created by the program display/editing unit 11. The program storage unit 13 also has stored therein an execution code of the entire program converted by the program conversion unit 14.

The program conversion unit 14 executes compilation, which is processing of converting the program code of the entire program stored in the program storage unit 13 to an execution code executable by the PLC 20. The execution code is obtained by arranging processes performed in the PLC 20 and is represented, for example, as a sequence of commands each being composed of an instruction and an operand thereof.

The program conversion unit 14 according to the present embodiment includes a function of converting a debug-specific instruction inserted by the program display/editing unit 11 into the entire program to a debug-specific instruction executable by the PLC 20.

The program conversion unit 14 reads an instruction managed by the instruction management unit 12 when a program code is to be converted to an execution code executable by the PLC 20. The program conversion unit 14 then converts the program code based on whether the read instruction is an official instruction or a debug-specific instruction. The program conversion unit 14 converts the program code in such a manner that whether each program code is an official instruction or a debug-specific instruction can be identified.

For example, the program conversion unit 14 adds information indicating an official instruction or information indicating a debug-specific instruction to each program code. The program conversion unit 14 transmits the converted entire program to the program storage unit 13 and the PLC communication unit 16.

Figure 3:
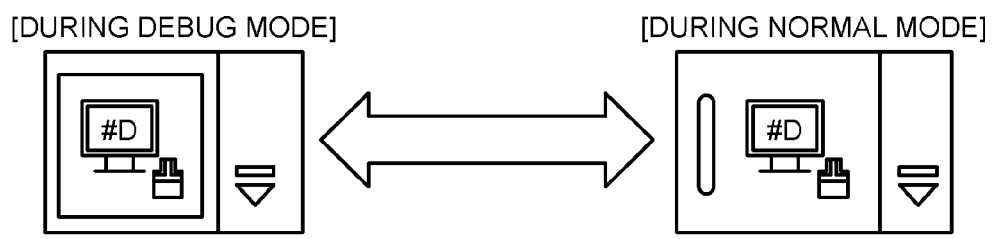
FIG. 3 is a diagram illustrating an example of a screen on which execution modes of a PLC are switched.

The execution switching unit 15 has a function of an interface that switches execution modes of the PLC 20. FIG. 3 is a diagram illustrating an example of a screen on which execution modes of the PLC are switched. The engineering tool 10 displays icons to be used to switch the execution modes of the PLC 20 on an edit screen of a sequence program. The icons to be used to switch the execution modes of the PLC 20 are an icon indicating the normal mode and an icon indicating the debug mode. The icon indicating the normal mode and the icon indicating the debug mode are arranged on a toolbar or the like of the screen for editing the sequence program.

The icon indicating the normal mode is selected when the official program is executed by the PLC 20 and the icon indicating the debug mode is selected when the debugging program is executed by the PLC 20.

When the icon indicating the normal mode is pressed, the execution switching unit 15 transmits an instruction indicating the normal mode to the PLC communication unit 16. When the icon indicating the debug mode is pressed, the execution switching unit 15 transmits an instruction indicating the debug mode to the PLC communication unit 16.

The PLC communication unit 16 writes the execution code of the entire program converted by the program conversion unit 14 to the PLC 20. The PLC communication unit 16 transmits an instruction for an operation in the normal mode or an instruction for an operation in the debug mode to the PLC 20. In the following descriptions, the instruction indicating the normal mode or the instruction indicating the debug mode is referred to as "mode switching instruction" in some cases.

The PLC 20 is H/W (hardware) that executes an execution code written by the PLC communication unit 16. The PLC 20 includes a program execution unit 21. The program execution unit 21 is a CPU (Central Processing Unit) or the like that performs processing of an execution code. The program execution unit 21 according to the present embodiment switches the mode of executing the entire program to either the debug mode or the normal mode according to a mode switching instruction. The program execution unit 21 executes the entire program in either the debug mode or the normal mode according to the mode switching instruction. The program execution unit 21 executes the debug-specific instruction in the debug mode and does not execute the debug-specific instruction in the normal mode. Alternatively, the program execution unit 21 can be a simulator realized by S/W.

Figure 4:
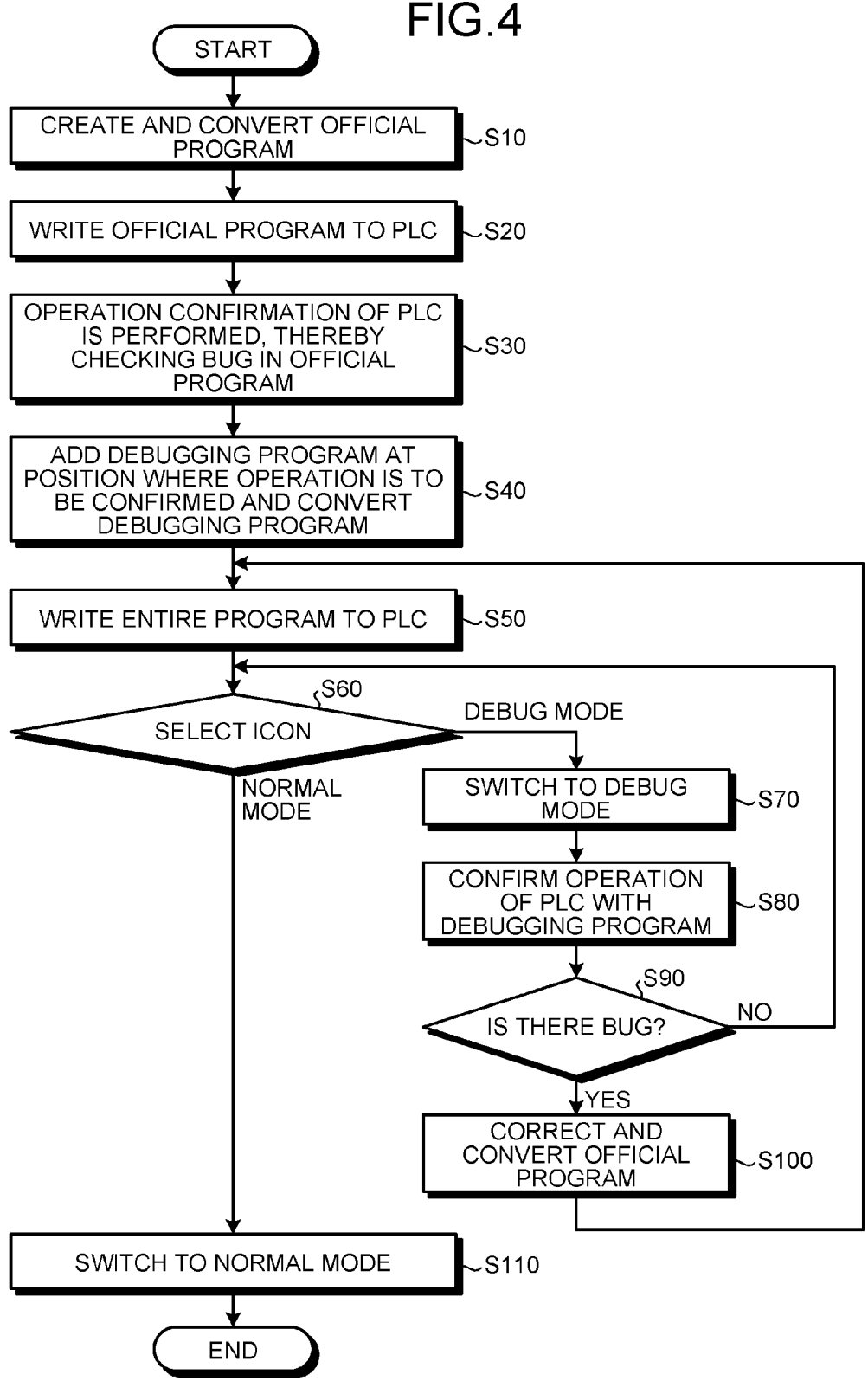
FIG. 4 is a flowchart illustrating a process procedure of debugging.

A process procedure of debugging performed by the debug system 1 is described next. FIG. 4 is a flowchart illustrating a process procedure of debugging. When an official program is created, the official program is written to the program storage unit 13 via the reception unit 31. The program conversion unit 14 converts a program code of the official program stored in the program storage unit 13 to an execution code executable by the PLC 20 (Step S10). The program storage unit 13 stores therein the execution code after the conversion.

The PLC communication unit 16 writes the execution code of the official program converted by the program conversion unit 14 to the PLC 20 (Step S20). Subsequently, the program execution unit 21 of the PLC 20 operates the PLC 20 using the official program. Next, operation confirmation of the PLC 20 is performed, thereby checking a bug of the official program (Step S30).

When a bug of the official program is detected, a debugging program using a debug-specific instruction is added at a position in the official program where the operation is to be confirmed. The debugging program is inserted into the official program. For example, a circuit element of "OR TRUE" is inserted into a condition portion of a circuit that is to be always ON. The official program having the debugging program inserted therein is written to the program storage unit 13 as the entire program.

The program conversion unit 14 converts the program code of the debugging program stored in the program storage unit 13 to an execution code executable by the PLC (Step S40). The program storage unit 13 stores therein the execution code after conversion.

Figure 5:
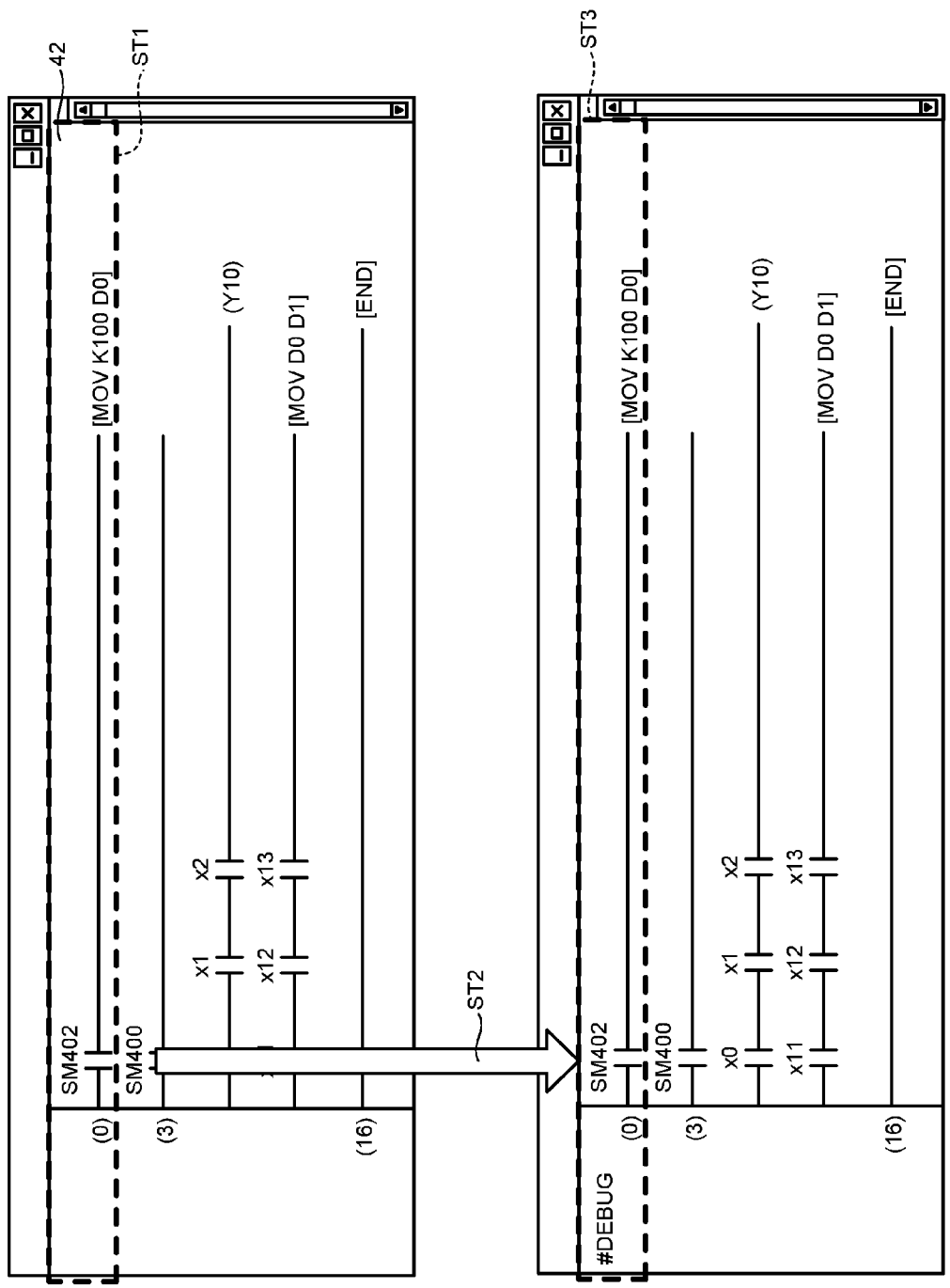
FIG. 5 is an explanatory diagram of a first creation example of a debugging program.

FIG. 5 is an explanatory diagram of a first creation example of a debugging program. FIG. 5 illustrates an image of an operation and a screen in a case where a selected range of an official program is changed to a debugging program after a circuit is created using the official program.

When an area 42 that is to be changed to the debugging program is selected by a user from a circuit area in which the official program is located (ST1), the program display/editing unit 11 highlights the selected area 42.

When a direction for display switching is thereafter input by the user to the reception unit 31, the program display/editing unit 11 switches the area 42 from the official program to the debugging program (ST2). The program display/editing unit 11 further causes information indicating an area in which the debugging program is set to be displayed in the area 42. The program display/editing unit 11 causes characters such as "#DEBUG" to be displayed in the area 42 (ST3). This enables the user to easily create the debugging program.

Figure 6:
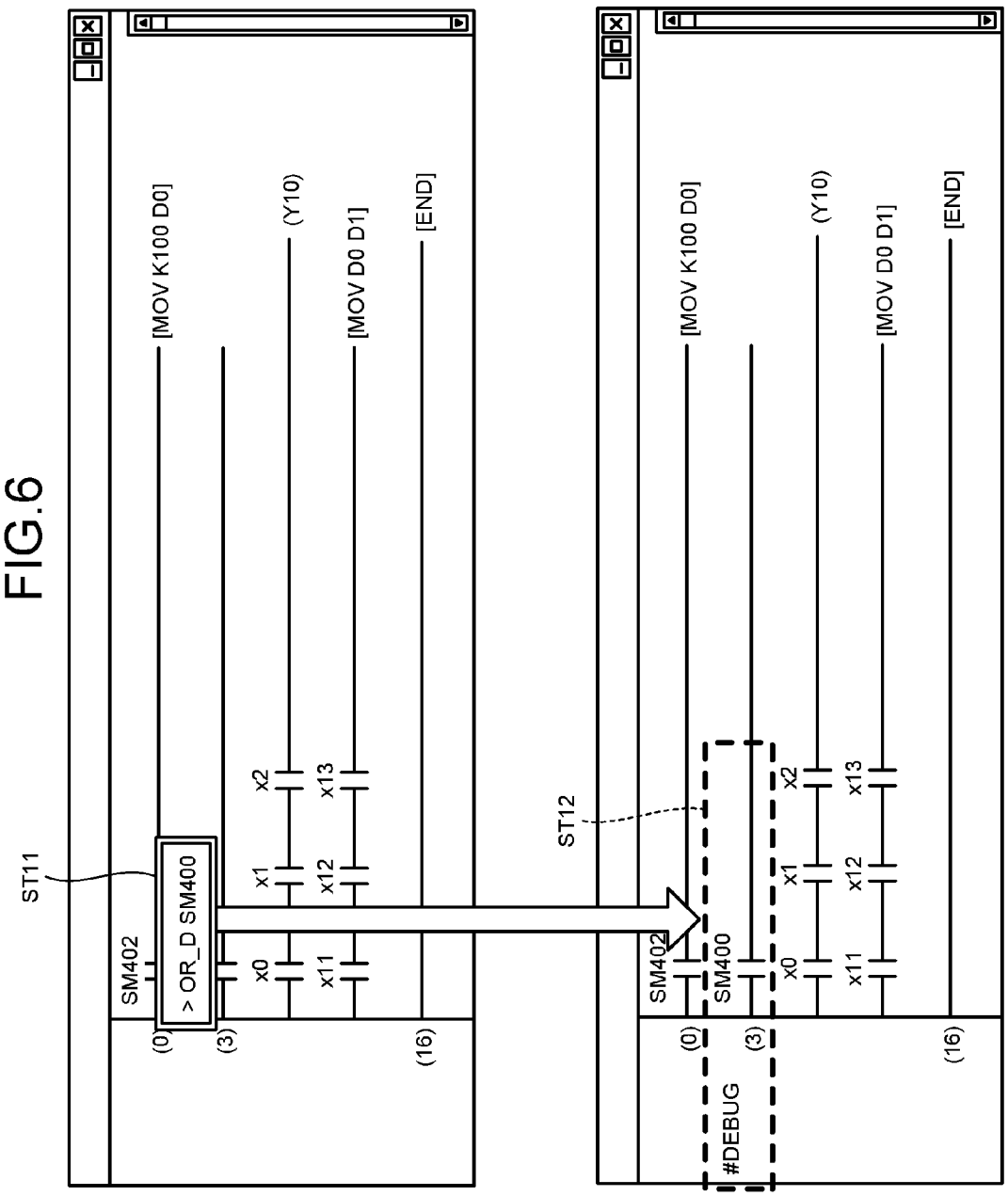
FIG. 6 is an explanatory diagram of a second creation example of a debugging program.

FIG. 6 is an explanatory diagram of a second creation example of the debugging program. FIG. 6 illustrates an example of a screen that is displayed by the program display/editing unit 11 in a case where a debug-specific instruction is input.

After causing the entire program to be displayed, the program display/editing unit 11 becomes a state of accepting editing of the entire program. When the user inputs any one of circuit positions in the entire program and a debug-specific instruction, the program display/editing unit 11 sets the input debug-specific instruction at the specified circuit position in the entire program (ST11).

The debug-specific instruction is, for example, "OR_D TRUE" corresponding to an OR instruction and is configured to be distinguishable from an official instruction owing to addition of characters "_D" to the official instruction. When the debug-specific instruction is input and determined by the user, the program display/editing unit 11 causes the input debug-specific instruction to be displayed as the debugging program (ST12). Accordingly, the user can easily discriminate between the debugging program and the official program.

After the program conversion unit 14 performs conversion of the debugging program, the PLC communication unit 16 writes an execution code of the converted debugging program to the PLC 20. Accordingly, a state is provided where the execution code of the debugging program and the execution code of the official program, which are converted by the program conversion unit 14, are written to the PLC 20. In this way, the PLC communication unit 16 writes the execution code of the debugging program and the execution code of the official program to the PLC 20, thereby writing the execution code of the entire program to the PLC 20 (Step S50).

When an icon for switching the execution mode is thereafter selected by the user, the execution switching unit 15 discriminates the type of the selected icon (Step S60). When the icon indicating the debug mode is selected (Step S60, debug mode), the execution switching unit 15 switches the execution mode of the PLC 20 to the debug mode (Step S70). Specifically, the PLC communication unit 16 transmits a mode switching instruction designating the debug mode to the program execution unit 21.

Thereafter, the program execution unit 21 operates the PLC 20 using the debugging program. Specifically, the program execution unit 21 operates the PLC 20 using the entire program including the debugging program and the official program. Operation confirmation of the PLC 20 is thereby performed (Step S80). Through operation confirmation of the PLC 20, a bug of the official program is checked (Step S90).

When there is a bug in the official program (YES at Step S90), the official program is corrected and the corrected official program is converted to an execution code by the program conversion unit 14 (Step S100).

Specifically, the program display/editing unit 11 causes the official program to be displayed on the display unit 32 and changes the official program according to a direction from the user. The program storage unit 13 stores therein the entire program having the official program changed. Thereafter, the program conversion unit 14 converts the changed portion of the entire program to an execution code that is executable by the PLC 20. The program storage unit 13 stores therein the execution code after conversion.

The PLC communication unit 16 writes the execution code of the official program converted by the program conversion unit 14 to the PLC 20. In this case, the execution code of the changed portion of the entire program is written to the PLC 20.

A state is thereby provided where the execution code of the debugging program and the execution code of the official program, which are converted by the program conversion unit 14, are written to the PLC 20. As a result, the execution code of the entire program is written to the PLC 20 (Step S50). An icon for switching the execution mode is thereafter selected by the user. The execution switching unit 15 determines the type of the selected icon (Step S60).

When there is no bug in the official program in the process at Step S90 (NO at Step S90), an icon for switching the execution mode is selected by the user. The execution switching unit 15 discriminates the type of the selected icon (Step S60).

When the icon indicating the debug mode is selected (Step S60, debug mode), the debug system 1 performs a series of processes at Steps S70 to S100, S50, and S60 or a series of processes at Steps S70 to S90 and S60.

On the other hand, when the icon indicating the normal mode is selected (Step S60, normal mode), the execution switching unit 15 switches the execution mode of the PLC 20 to the normal mode (Step S110). Specifically, the PLC communication unit 16 transmits a mode switching instruction designating the normal mode to the program execution unit 21.

Thereafter, the program execution unit 21 operates the PLC 20 using the official program. Specifically, the program execution unit 21 operates the PLC 20 using only the official program out of the entire program without using the debugging program. In the debug system 1, the operation of the PLC 20 using the official program is thereby performed.

A configuration example of the debug-specific instruction is described next. The debug-specific instruction is a CPU instruction that is executed by the program execution unit 21 and consists of a predetermined number of bits (32 bits, for example). In the present embodiment, information indicating the debug mode is contained in a debug-specific instruction. Information indicating the normal mode is contained in an official instruction.

In each of the debug-specific instruction and the official instruction, an address, a base number, an instruction execution condition, an instruction, an instruction type, and the like are contained. The address is, for example, an offset value from a specified base. For example, a bit indicating the debug mode or the normal mode is added in the instruction execution condition.

Specifically, a bit indicating the debug mode is contained in the execution condition in the debug-specific instruction and a bit indicating the normal mode is contained in the execution condition in the official instruction. The program execution unit 21 switches operation modes based on the bit indicating the debug mode or the normal mode.

Alternatively, information indicating the debug mode or the normal mode can be contained in a predetermined bit (for example, high-order 1 bit) among bits indicating the address. For example, in the debug system 1, 0x8000 to 0xFFFF are set as the debug-specific instruction. The program execution unit 21 thus switches the operation modes based on the address.

When the information indicating the debug mode is contained in the CPU instruction, this CPU instruction is a debug-specific instruction and thus the program execution unit 21 operates the PLC 20 using the debugging program.

When the information indicating the normal mode is contained in the CPU instruction, this CPU instruction is an official instruction and thus the program execution unit 21 operates the PLC 20 using the official program. Because the debug system 1 according to the present embodiment does not use the debugging program during execution in the normal mode, there is no influence on the execution operation in the normal mode.

When the information indicating the debug mode is to be contained in the CPU instruction, the information indicating the normal mode does not need to be contained in the CPU instruction. In this case, the program execution unit 21 determines that the CPU instruction is an official instruction when the information indicating the debug mode is not contained in the CPU instruction.

When the information indicating the normal mode is to be contained in the CPU instruction, the information indicating the debug mode does not need to be contained in the CPU instruction. In this case, the program execution unit 21 determines that the CPU instruction is a debug-specific instruction when the information indicating the normal mode is not contained in the CPU instruction.

Figure 7:
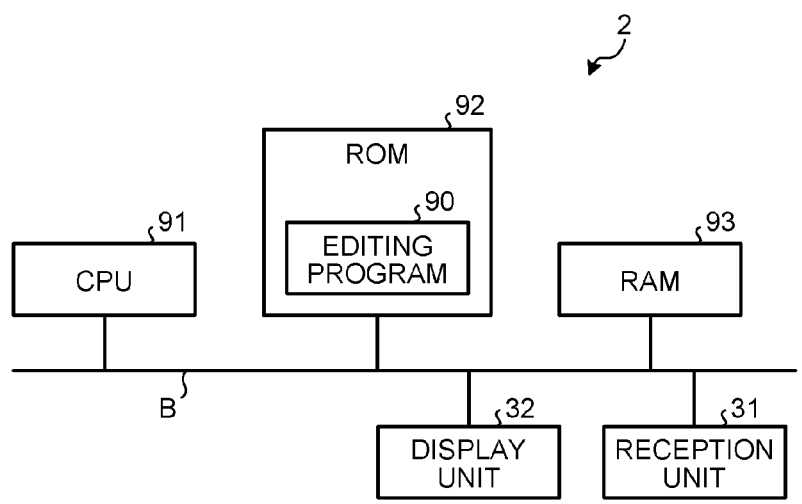
FIG. 7 is a diagram illustrating a hardware configuration of a program editing device.

FIG. 7 is a diagram illustrating a hardware configuration of the program editing device. The program editing device 2 has a CPU 91, a ROM (Read Only Memory) 92, a RAM (Random Access Memory) 93, the display unit 32, and the reception unit 31. In the program editing device 2, the CPU 91, the ROM 92, the RAM 93, the display unit 32, and the reception unit 31 are connected via a bus line B.

The CPU 91 performs editing of the official program using an editing program 90 as a computer program. The display unit 32 is a display device such as a liquid crystal monitor and displays the official program, the debugging program, the entire program, an operation state of the PLC 20, and the like based on a direction from the CPU 91. The reception unit 31 is configured to include a mouse or a keyboard and receives parameters or the like necessary for program editing as direction information externally input from a user. The direction information received by the reception unit 31 is transmitted to the CPU 91.

The editing program 90 is stored in the ROM 92 and is loaded to the RAM 93 via the bus line B. The CPU 91 executes the editing program 90 loaded in the RAM 93. Specifically, in the program editing device 2, the CPU 91 reads the editing program 90 from the ROM 92 according to a direction input to the reception unit 31 by a user and decompresses the editing program 90 in a program storage area in the RAM 93 to perform various processes. The CPU 91 temporarily stores various data generated in the various processes in a data storage area formed in the RAM 93.

The editing program 90 executed in the program editing device 2 has a module configuration including the program display/editing unit 11, the instruction management unit 12, the program conversion unit 14, the execution switching unit 15, and the PLC communication unit 16. These units are loaded on a main storage device and are generated on the main storage device. Respective functions of the instruction management unit 12, the program conversion unit 14, the execution switching unit 15, and the PLC communication unit 16 can be alternatively stored in a different program from the editing program 90.

As described above, in the debug system 1, execution switching between the official program that is being debugged and the debugging program can be performed in one operation. Accordingly, correction of a sequence program, conversion thereof, and a write operation to the PLC 20 do not need to be repeated. As a result, the amount of work such as program creation or setting as work at the time of debug can be reduced.

Furthermore, deletion of the debugging program, conversion of the official program from which the debugging program has been deleted, and performing writing processing to the PLC 20 after the end of debugging are not required for the sake of operating the PLC 20. Therefore, the amount of work of switching to the official program after the end of debugging can be reduced. Furthermore, because quality degradation due to forgetting to delete the debugging program or the like can be prevented, the quality of the sequence program can be maintained.

The official program and the debugging program are one object. The normal mode and the debug mode are switched according to whether to execute an instruction in the entire program. Therefore, there is no need to separately generate the official program and the debugging program.

Alternatively, the program conversion unit 14 can convert the official program and the debugging program simultaneously in a lump. The PLC communication unit 16 can write the official program and the debugging program to the program execution unit 21 simultaneously in a lump.

As described above, because the present embodiment can reduce the number of a series of operations in debugging work, the number of processes in debugging work for a sequence program can be reduced. Therefore, it is possible to create a sequence program that can be debugged easily in a short time.

INDUSTRIAL APPLICABILITY

As described above, the engineering tool, the program editing device, and the program editing system according to the present invention are suitable for creating a sequence program.

REFERENCE SIGNS LIST

1 debug system, 2 program editing device, 10 engineering tool, 11 program display/editing unit, 12 instruction management unit, 13 program storage unit, 14 program conversion unit, 15 execution switching unit, 16 PLC communication unit, 20 PLC, 21 program execution unit, 31 reception unit, 32 display unit, 41 debugging program.

The invention claimed is:

1. An engineering tool comprising:
    a memory to store executable instructions; and
    a hardware processor to execute the stored instructions, which when executed by the processor cause the processor to perform the following operations:
    edit an official program to be run as an actual product and a debugging program to be used at a time of operation confirmation of the official program distinctively in such a manner that the debugging program is executed by a controller when the debugging program is selected and that the official program is executed by the controller without the debugging program being executed when the debugging program is not selected;
    convert the official program and the debugging program to be executable by the controller; and
    switch a mode to be performed by the controller to either a debug mode in which the debugging program is executed or a normal mode in which the official program is executed based on direction information input by a user, wherein
    when a selection direction to select a circuit from among the plurality of circuits in the official program and a switching direction to switch the selected circuit to the debugging program are input by the user, the processor creates the debugging program by changing the selected circuit to the debugging program.

2. The engineering tool according to claim 1, wherein the processor adds information distinguishing between the official program and the debugging program to at least one of the official program and the debugging program, wherein the official program is a sequence program, and wherein the added information is distinguishing information for displaying a distinction between the official program and the debugging program.

3. The engineering tool according to claim 1, wherein the processor creates the debugging program by inserting a debug-specific instruction to be used in the debugging program into the official program based on direction information input by the user and wherein the processor causes the debugging program to be displayed on a display distinctively from the official program.

4. The engineering tool according to claim 3, wherein the memory further stores distinctively an official instruction to be used in the official program and the debug-specific instruction to be used in the debugging program as instructions that can be input by the processor as the official program or the debugging program, and
   wherein the processor distinctively edits the official program and the debugging program based on the instructions stored in the memory, and
   wherein the official program is a ladder diagram.

5. The engineering tool according to claim 4, wherein the processor converts the official program and the debugging program to be executable by the controller based on instructions stored in the memory.

6. The engineering tool according to claim 1, further comprising: a communication interface that writes the official program and the debugging program after conversion to the controller,
   wherein the controller is a programmable logic controller and the official program is a sequence program which controls operations of a device when executed by the controller.

7. A program editing device comprising:
   a memory to store executable instructions; and
   a hardware processor to execute the stored instructions, which when executed by the processor cause the processor to perform the following operations:
   edit an official program to be run as an actual product and a debugging program to be used at a time of operation confirmation of the official program distinctively in such a manner that the debugging program is executed by a controller when the debugging program is selected and that the official program is executed by the controller without the debugging program being executed when the debugging program is not selected;
   convert the official program and the debugging program to be executable by the controller; and
   switch a mode to be performed by the controller to either a debug mode in which the debugging program is executed or a normal mode in which the official program is executed based on direction information input by a user,
   wherein, when a selection direction to select a circuit from among the plurality of circuits in the official program and a switching direction to switch the selected circuit to the debugging program are input by the user, the processor creates the debugging program by changing the selected circuit to the debugging program.

8. A program editing system comprising:
   a program editing device comprises a hardware processor that edits a sequence program; and
   a hardware controller that operates using a sequence program transmitted from the program editing device, wherein:
   the sequence program includes an official program to be run as an actual product and a debugging program to be used at a time of operation confirmation of the official program,
   the processor edits the official program and the debugging program distinctively in such a manner that the debugging program is executed by the controller when the debugging program is selected and that the official program is executed by the controller without the debugging program being executed when the debugging program is not selected;
   the processor further converts the official program and the debugging program to be executable by the controller; and
   the processor switches a mode to be performed by the controller to either a debug mode in which the debugging program is executed or a normal mode in which the official program is executed based on direction information input by a user, and
   the controller executes the debugging program when the debugging program is selected and executes the official program without executing the debugging program when the debugging program is not selected,
   wherein, when a selection direction to select a circuit from among the plurality of circuits in the official program and a switching direction to switch the selected circuit to the debugging program are input by the user, the processor creates the debugging program by changing the selected circuit to the debugging program.

* * * * *